(12) United States Patent
Radliff

(10) Patent No.: US 6,280,235 B1
(45) Date of Patent: Aug. 28, 2001

(54) ENCLOSURE FOR SPLICED CABLE

(75) Inventor: David R. Radliff, Harrisburg, PA (US)

(73) Assignee: Tyco Electronics Corporation, Wilmington, DE (US)

( * ) Notice: Subject to any disclaimer, the term of this patent is extended or adjusted under 35 U.S.C. 154(b) by 0 days.

(21) Appl. No.: 09/596,882

(22) Filed: Jun. 20, 2000

(51) Int. Cl.⁷ .................................................. H01R 13/58
(52) U.S. Cl. ........................................... 439/467; 439/456
(58) Field of Search ................................... 439/466, 467, 439/456, 459, 27, 165; 174/92, 93

(56) References Cited

U.S. PATENT DOCUMENTS

| | | | |
|---|---|---|---|
| 5,133,674 | * 7/1992 | Albrecht | 439/465 |
| 5,561,269 | 10/1996 | Robertson et al. | 174/92 |
| 5,606,150 | 2/1997 | Radliff et al. | 174/92 |
| 5,656,797 | * 8/1997 | Lin | 174/91 |
| 5,684,274 | * 11/1997 | McLeod | 174/92 |
| 5,691,508 | 11/1997 | Radliff et al. | 174/92 |
| 5,796,041 | * 8/1998 | Suzuki et al. | 174/92 |

OTHER PUBLICATIONS

AMP Instruction Sheet 408–3371, Aug. 3, 1999 Rev B, Certi–Seal* Wire Splice Closure 569579–1, pp. 1 of 2 and 2 of 2.

* cited by examiner

*Primary Examiner*—Tulsidas Patel

(57) ABSTRACT

An electrical connector housing is shown which is profiled for use as a splicing enclosure for telephone cable. The enclosure is adapted to accommodate two different sized cables, two 2-twisted pair cable or two 6-twisted pair cable. Two separate strain relief devices are provided for gripping retention of the two cables. The enclosure is embodied as a bi-partite housing having two hinged housing halves which can be folded over to form the enclosure. The two separate strain relief members are located at opposed positions within different housing halves, and include a plurality of gripping edges formed to grip and retain the cables.

34 Claims, 6 Drawing Sheets

ENCLOSURE FOR SPLICED CABLE

FIELD OF THE INVENTION

The present invention relates to the field of electrical connections and more particularly to enclosures for spliced cable connections such as telephone wires.

BACKGROUND OF THE INVENTION

It is common in the telephone industry, where cable splices need to be made along the path of distribution, that splices be made which will include some type of an electrical connection to splice the individual wires of the cable and environmentally seal them in a connection enclosure to prevent degradation to the connection. This type of splice could be either a so-called drop wire splice or could be a buried splice in the case of underground cable. It is also common to have both two or six pairs of twisted wire which comprise the telephone cable.

As in almost any electrical connection device, where a cable is involved, and where an individual wire or a plurality of wires are interconnected to terminals or like wires, a so-called strain relief mechanism is desirable, such that tension or force outwardly on the cable is not transmitted to the electrical connection of the wires, but rather the force as transmitted to a housing into which the cable is being terminated. Various strain relief mechanisms exist in the marketplace and in the prior art for transferring the forces to the connector housings.

One such device is shown in the Tyco Electronics (AMP Division) commercial product known as the CERTI-SEAL wire splice enclosure where the housing is formed as a shell of two similar halves, where one of the halves includes upstanding posts. The cables to be spliced are brought in from opposite ends and the cables are laced around the posts in a meandering fashion. The individual wires are then interconnected to one another by splice connection blocks known as TEL-SPLICE (also a commercial of Tyco Electronics) for making the individual wire splices.

While the above-mentioned connection assembly is adequate for its intended use, it would be, however, advantageous to provide such a splice enclosure which could either be used for a buried drop wire splice, or a so-called aerial drop wire splice interchangeably. In addition to being interchangeable between the specific application, it would also be advantageous to have a splice enclosure which can accommodate more than one cable size, in order that the enclosure can accommodate at least the two most common splice cable sizes, that is, the two pair and six pair as discussed above.

SUMMARY OF THE INVENTION

The objects of the invention have been accomplished by providing an electrical connector housing having first and second housing parts movable between open and closed positions, where the first and second housings cooperate to define a cable receiving opening into the housing. The first housing part has a first strain relief member positioned adjacent the opening, for gripping a cable of a first dimension, and the second housing part has a second strain relief member positioned adjacent the opening for gripping a cable of a second dimension, whereby alternative cables of either first or second dimension may be positioned through the opening.

Preferably, the connector housing is profiled for splicing at least two cables, the housing having two cable receiving openings extending into the connector housing. The connector housing is also preferably a clam shell style which, when in the closed position, is substantially cylindrical in configuration.

The enclosure is also profiled such that the first strain relief member is profiled to overlap the second strain relief member. In this configuration, the first strain relief member is defined by upstanding side walls and a transverse wall section interconnecting the side walls. Preferably, the first strain relief member is defined as a plurality of individual upstanding side walls. Also preferably, the upstanding side walls have barbed edges for gripping the cable. The transverse wall sections are progressively lowered, from a position adjacent to said openings, to an inner position of said housing and the second strain relief member is receivable between the upstanding side walls. In the preferred embodiment, the second strain relief is formed as a sinuous slot. In this embodiment, the upper surfaces of the second strain relief member are reversely progressed to conform to the profile defined by the transverse wall sections, whereby, when the first and second housing parts are in a closed position, the top surfaces and transverse wall portions cooperate to define a cable receiving channel therein.

In another aspect of the invention, an electrical connector housing is provided for encasing individual wires of cables to be spliced. The housing has openings therein for receiving the cables, where the housing further includes bi-partite housing members, where a first housing member includes strain relief devices positioned adjacent to the openings for retaining cables to be spliced, and wherein a second housing member includes urging members positioned adjacent to the cable strain relief members when the first and second housing members are in the closed position, to urge the cables into the strain relief device.

Preferably, the urging members include second strain relief members, for alternatively gripping cables of a different dimension than the first strain relief members. The connector housing can be a clam shell style which, in the closed position, is substantially cylindrical in configuration. Preferably, the first strain relief member is profiled to overlap said second strain relief member. In this embodiment, the first strain relief member is defined by upstanding side walls and a transverse wall section interconnecting said side walls. Preferably, the first strain relief member is defined as a plurality of individual upstanding side walls, and the upstanding side walls have barbed edges for gripping the cable. In this embodiment, the transverse wall sections are progressively lowered, from a position adjacent to the openings, to an inner position of the housing. Also preferably, the top surfaces of the second strain relief member are reversely progressed to conform to the profile defined by the transverse wall sections, whereby, when the first and second housing parts are in a closed position, the top surfaces and transverse wall portions cooperate to define a cable receiving channel therein. Preferably, the second strain relief is formed as a sinuous slot.

In yet another embodiment of the invention, an electrical connector for connection with a cable, has an insulative housing having at least one connection device therein for connection to a wire of the cable, the housing comprising an opening therethrough for receipt of the cable and a strain relief device proximate the opening, the strain relief device including a plurality of tandemly arranged walls having a longitudinal cable receiving slot therein, the walls having barbed edges for gripping the cable.

In a preferred embodiment of the invention, the electrical connector walls define side walls and transverse wall sections, and the slot is sinuous in the longitudinal direction. Also preferably, the insulative housing is comprised of bi-partite housing members, with an opening at each end, with strain relief members adjacent each opening.

In one embodiment, the insulative housing is comprised of bi-partite housing members, with a first strain relief member on a first bi-partite housing member, for accommodating a cable of a first diameter, and a second strain relief member on a second bi-partite housing member, for accommodating a cable of a second diameter, whereby alternative cables can be terminated. Preferably, the first strain relief device at least partially overlaps said second strain relief device, when in the closed position. Also preferably, a top surface of said tandemly arranged walls of said second strain relief device is positioned adjacent to said transverse wall sections of the first strain relief device, when in the closed position, and form urging surfaces for urging the cable into the slot. Also preferably, upper surfaces of the second strain relief member are reversely progressed to conform to the profile defined by the transverse wall sections, whereby, when the first and second housing parts are in a closed position, said top surfaces and transverse wall portions cooperate to define a cable receiving channel therein.

DETAILED DESCRIPTION OF THE PREFERRED EMBODIMENT

Figure 1:
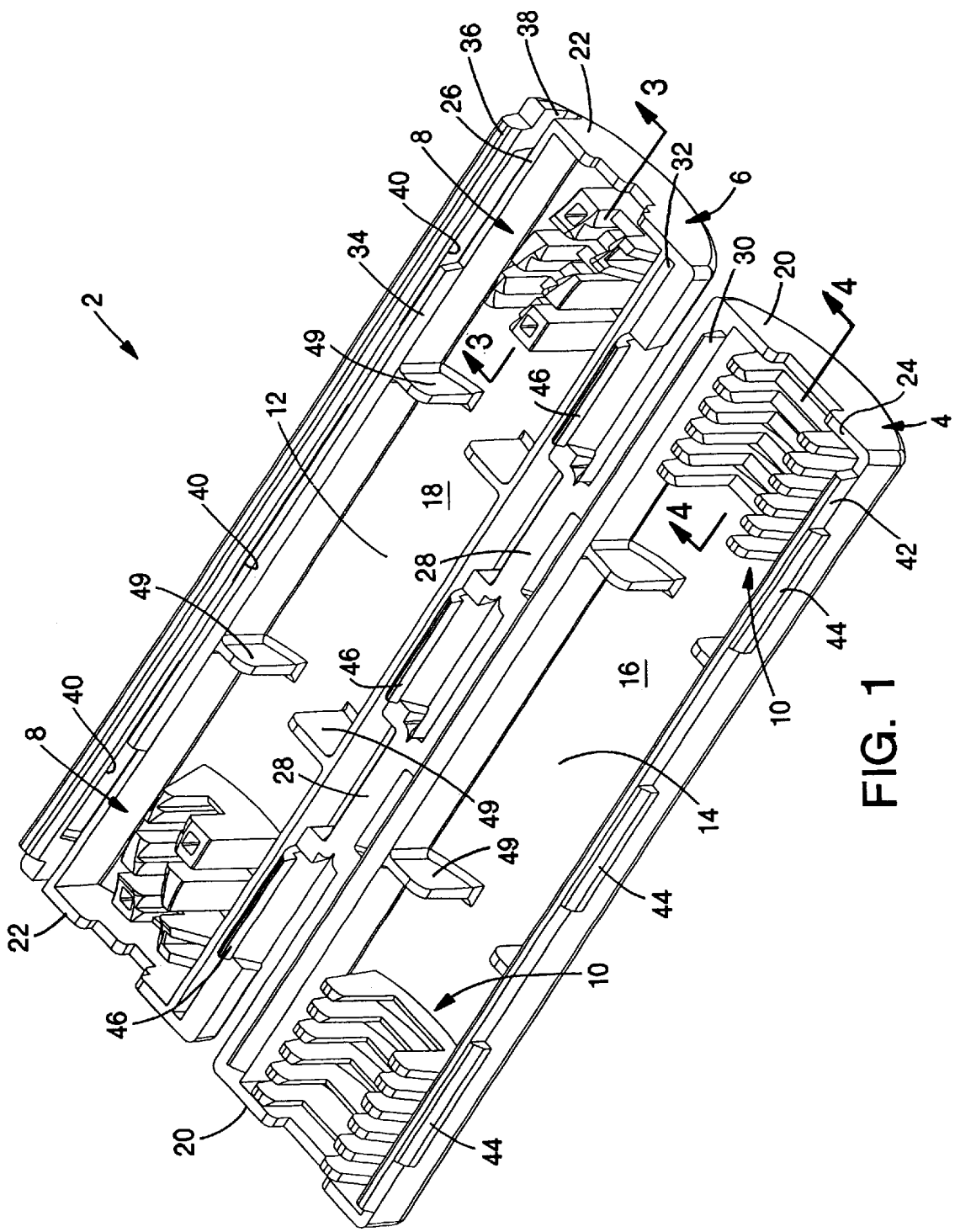
FIG. 1 is a perspective view of the enclosure for the spliced cable according to the preferred embodiment of the invention.
Figure 1A:
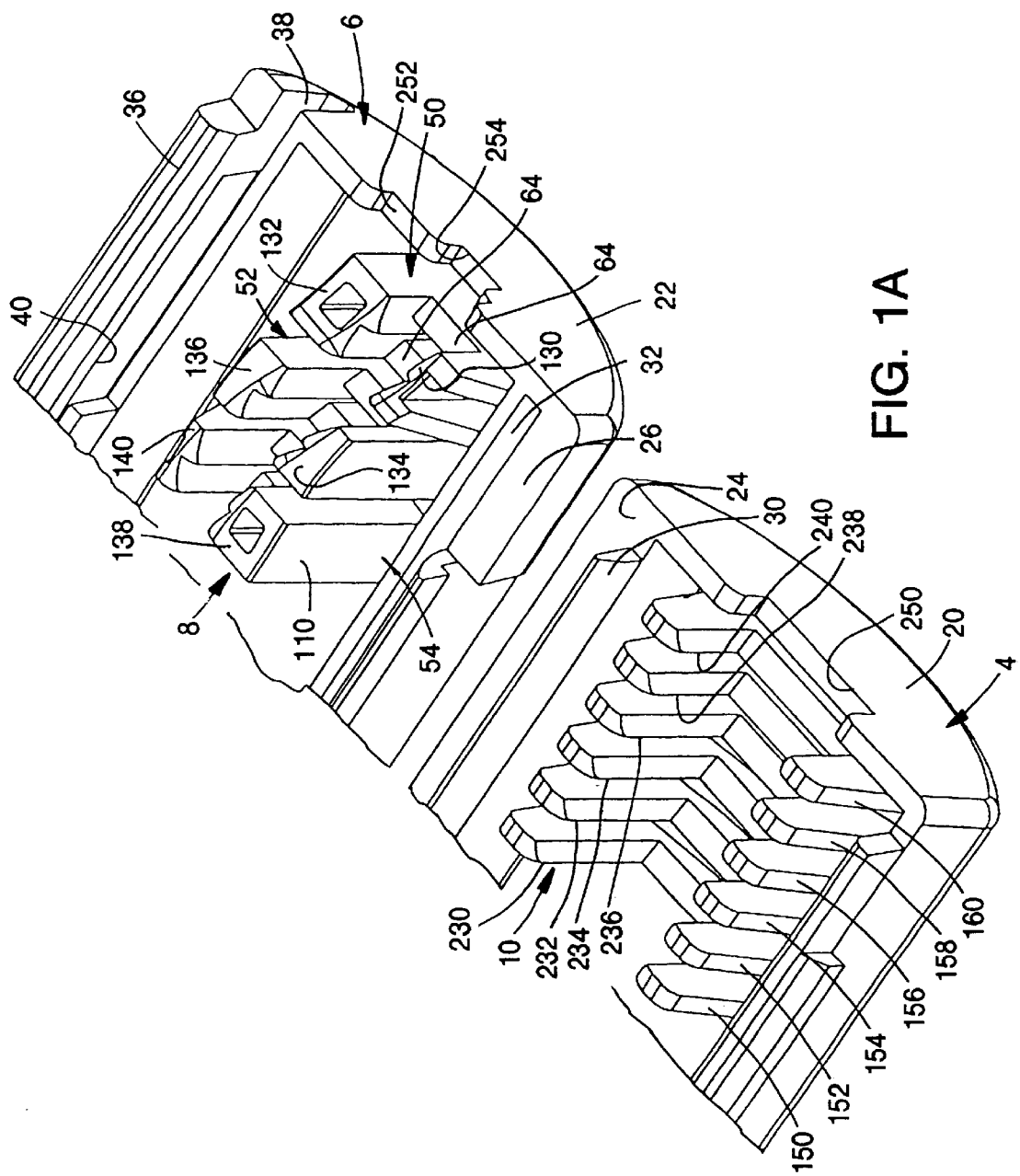
FIG. 1A is an enlarged view of the end of the enclosure shown in FIG. 1.

With respect first to FIG. 1, an enclosure according to the preferred embodiment of the invention is shown generally at 2, which is a bi-partite cover member comprised of housing members 4 and 6. The housing members 4 and 6 are generally comprised of strain relief members 8 and 10, and a central splice area defined by sections 12 and 14. With reference now to FIGS. 1 and 1A, the housing members will be described in greater detail.

Figure 2:
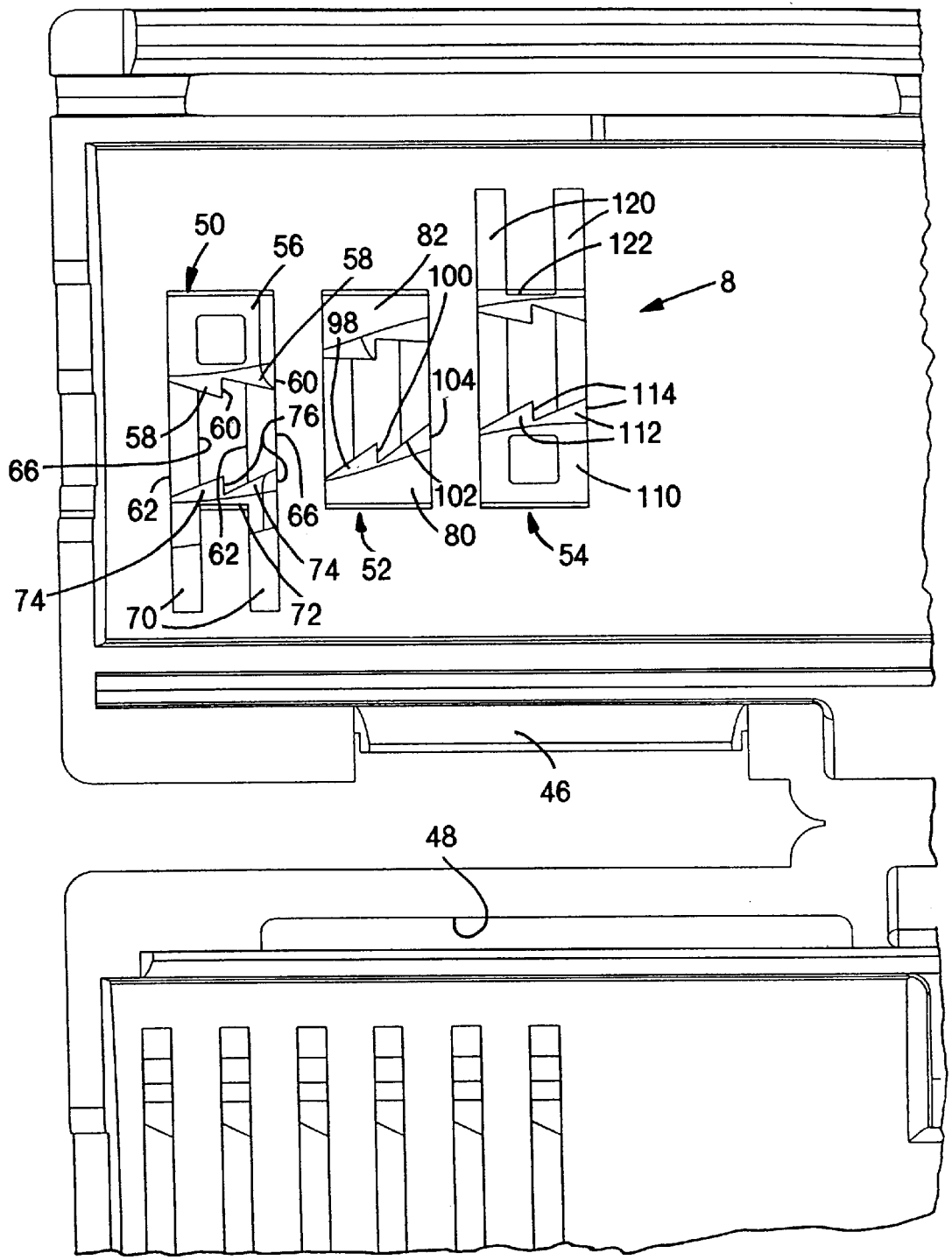
FIG. 2 is an enlarged upper plan view of one end of the enclosure.

As shown best in FIG. 1, each of the housings 4, 6 are semi-cylindrical and include semi-cylindrical surfaces 16 and 18. The housing portion 4 includes end walls 20 at opposite ends thereof, whereas housing member 6 includes end walls 22. The housing member 4 includes a perimetral surface 24, whereas housing member 6 includes a perimetral surface 26. The two housing members 4, 6 are interconnected together by hinges 28 allowing them to be rotated relative to each other. A sealing wall 30 extends upwardly from the perimetral surface 24 which corresponds with a slot 32 in perimetral wall 26. Housing 6 further includes a sealing wall 34 with an offset latching wall at 36 defining therebetween a slot 38. Latching wall 36 defines latching surfaces 40 and housing 4 includes a sealing wall 42 having individual latch members 44 which correspond with latching surfaces 40 when in the closed position. Similarly, latch members 46, as shown in FIGS. 1 and 2, correspond with latching recesses 48 (FIG. 2) when the housing members 4 and 6 are in the closed position. Finally, the housing members 4, 6 include sealing dams 49, which will be described herein.

Figure 3:
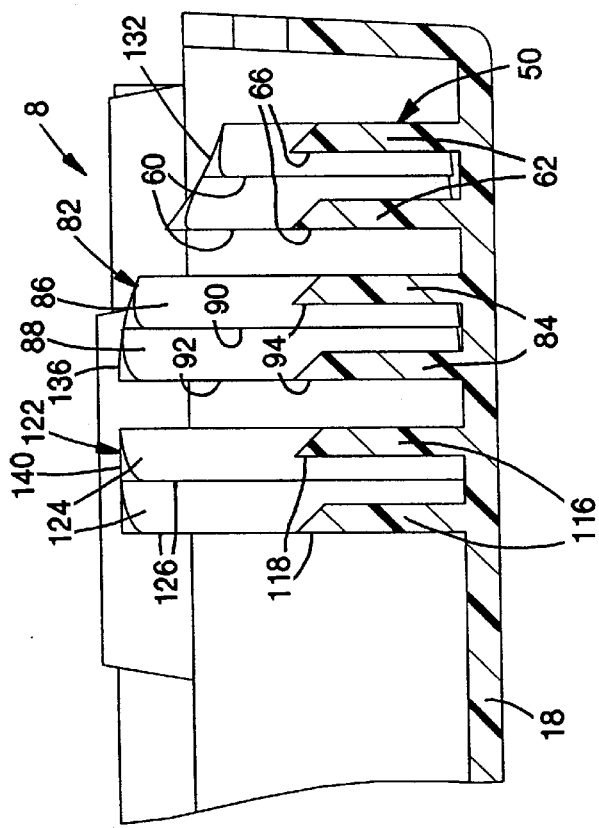
FIG. 3 is a cross sectional view through lines 3—3 of FIG. 1.

With respect now to FIGS. 1A and 2, the strain relief members 8 will be described in greater detail. With respect first to FIG. 2, it should be appreciated that the strain relief member 8 is comprised of individually upstanding walls shown at 50, 52, and 54. As shown in FIG. 2, the upstanding wall 50 includes a wall section 56 having an inner surface defined by a gripping surface, preferably by barb members 58 thereby defining inwardly facing gripping edges at 60. The upstanding wall 50 further includes two transverse wall portions at 62 which also include barb members 64 defining inwardly facing gripping edges 66. On the opposite side of wall section 56 are support walls at 70 which support an upstanding wall at 72 having barb members 74 defining inwardly facing gripping edges 76. With reference to FIGS. 2 and 3, the intermediate upstanding wall 52 includes upstanding walls 80 and 82 and transverse wall portions 84. As shown in FIG. 3, the upstanding wall 82 has barb members 86 and 88 defining inwardly facing gripping edges 90 and 92, while the walls 84 define gripping edges at 94. Furthermore, as shown in FIG. 2, upstanding wall 80 includes a barb member 98 having an inwardly facing gripping edge 100 and a barb member 102 having inwardly facing gripping edges 104.

Wall section 54 includes an upstanding wall portion 110 having barb members 112 forming inwardly facing gripping edges 114. Upstanding wall member 54 further includes transverse walls 116 (FIG. 3) defining inwardly facing gripping surfaces at 118. Further, the wall 54 is comprised of upstanding support walls at 120 supporting a wall section 122. The wall section 122 has barb members at 124 defining inwardly facing gripping edges at 126 (FIG. 3). With respect now to FIGS. 1A and 3, the top surfaces of walls 50, 52, and 54 define the contour as shown in FIG. 3, where the wall 50 includes top surfaces 130 and 132; wall 52 includes top surfaces 134 and 136; and wall 54 includes top surfaces 138 and 140. With reference to FIG. 2, it should be appreciated that the cable receiving slot, which is formed by the various upstanding walls and barb members, is contoured as a sinuous slot bounded by the inwardly facing gripping edges.

Figure 4:
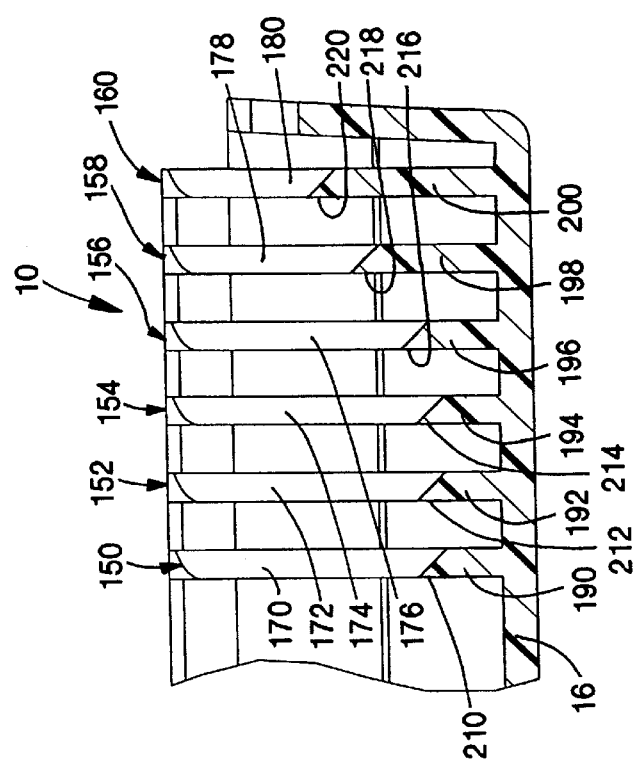
FIG. 4 is a cross sectional view through lines 4—4 of FIG. 1.

With respect now to FIGS. 1A and 4, the strain relief member 10 is comprised of a plurality of upstanding walls 150–160, where the walls generally comprise upstanding wall portions 170–180, and transverse wall portions 190–200, thereby defining inwardly facing gripping edges 210–220 and upstanding and inwardly facing gripping edges 230–240. As shown best in FIG. 4, the wall portions 190–200 progress in height from inside to outside, the purpose of which will be described in greater detail herein.

The enclosure 2 further comprises cable-receiving openings into each end of the enclosure. For example, with respect to FIG. 1A, end wall 20 includes an opening section at 250 with a complementary opening section 252 extending through end wall 22. It should be appreciated that when the enclosure housing members 4 and 6 are fully closed, the two opening sections 250 and 252 cooperate to form a substantially rectangular opening. In the preferred embodiment of the invention, this opening is profiled to receive a six-pair, twisted pair drop wire cable, when the cable width is lying in the horizontal plane. With respect still to FIG. 1A, the end wall 22 further includes an opening section at 254, which, together with opening section 250, is profiled to receive a two-pair drop wire cable while on its edge, as described further below.

Figure 6:
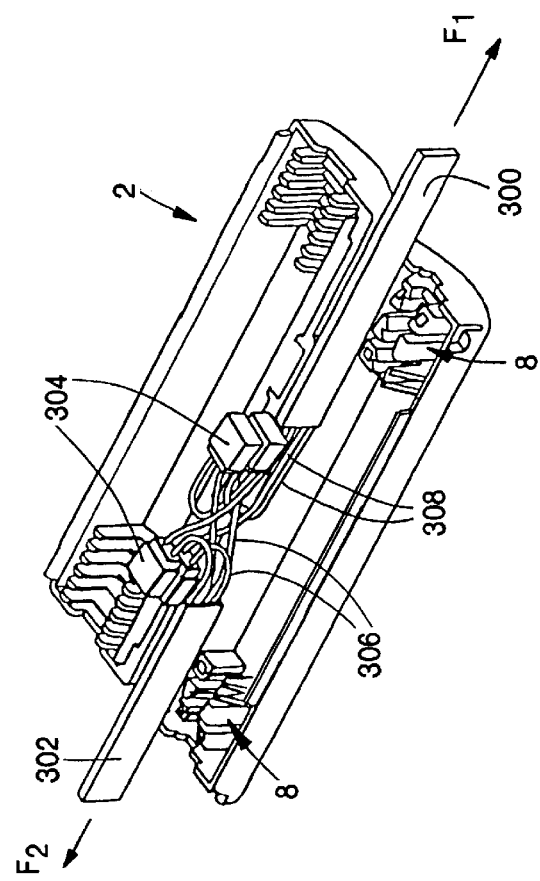
FIG. 6 is a perspective view showing a two-pair cable spliced and poised for receipt in the enclosure.

With the enclosure as described above, the application and operation of the enclosure will now be described. With reference first to FIG. 6, the enclosure can be used to enclose and seal two cables having two twisted pairs, 300 and 302, with individual wire connectors 304. The individual wire connectors 304 can be any type of electrical connector, as is known in the art, but those shown are TEL-SPLICE electrical connectors, as described above. These electrical connectors 304 will terminate like conductors of the twisted pair from each cable, that is, individual wires such as 306 and 308.

When the two cables, 300 and 302, are terminated as shown in FIG. 6, the two cables, 300 and 302, can be positioned such that the outer insulation of the cables 300 and 302 is positioned over respective strain relief members 8 at opposite ends of the enclosure 2. The cables 300 and 302 can now be positioned within the strain relief members 8 between respective walls 56, 72; 80, 82; and 110, 122 shown in FIG. 2. It should also be appreciated that the distance between respective barb members, such as 58, 74 of individual wall 50, are sized and spaced such that the cable outer insulation of the cable 300 and 302 is interferingly received between the barb members 58, 74. The same holds true with other respective pairs of barbed members in the individual upstanding walls 52 and 54. This places the individual wire connectors 304 in the central splice area 14 and with respective cables 300 and 302 extending from opposite ends of the enclosure. It should be appreciated that the enclosure halves, that is, items 4 and 6, can now be closed to form a complete assembly. In some applications, it may be desirable to provide a sealing grease or sealing gel within the enclosure to provide for a completely water-tight environment for the individual wire connectors. In such applications, it is common to insert a sufficient quantity of sealing material, such as a gel or grease to cause the gel or grease to flow towards the individual connectors so as to fill any air pockets therearound. Advantageously, the sealing wall 30 with its associated slot 32, together with the sealing wall 42 in its associated slot 38, once latched, will prevent the flow of this highly viscous fluid out of the side wall seams about the perimetral wall 26. Sealing dams 49 also inhibit the flow of the sealing material towards the strain relief area, keeping it confined around the connectors 304, 314. With the two cables 300 and 302 fully terminated and positioned in the complete enclosure as described above, force or strain, such as $F_1$ or $F_2$ as depicted in FIG. 6, will be taken up by the cable insulation through the gripping edges, such as 60 of strain relief wall 50, so that the strain is not transferred into the individual conductors such as 306 and 308.

Figure 7:
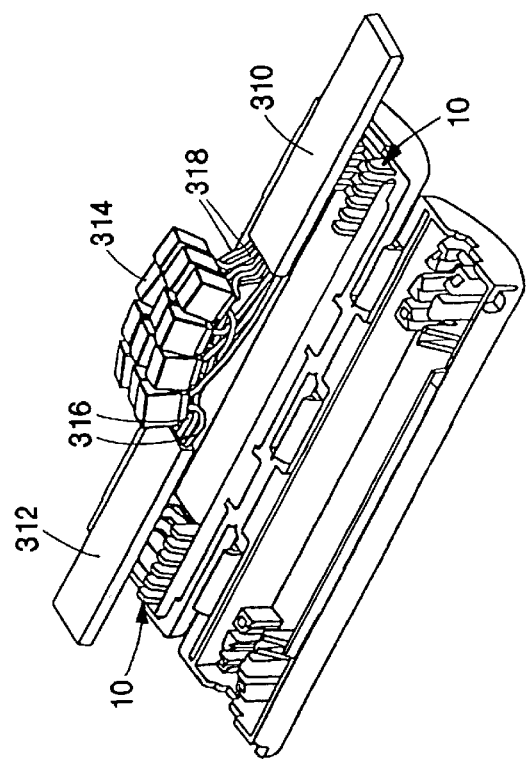
FIG. 7 is a perspective view showing two six-pair cables spliced and poised for receipt in its respective enclosure.

Alternatively, the identical enclosure 2 can be used to terminate two cables having 6 twisted pair conductors as shown in FIG. 7. When the enclosure 2 is used to splice two 6-twisted pair conductor cable, the cables 310 and 312 are positioned intermediate the pair of upstanding walls 150–160 (FIG. 1A) with the individual wire connectors 314 positioned in the central opening 12. In this application, the strain relief device 8 assists in the strain relief of the cables 310, 312. As shown best in FIG. 5, the individual walls which form the strain relief device 8, that is, individual walls 50, 52, and 54, are profiled such that they are receivable intermediate the individual walls 150–160.

Figure 5:
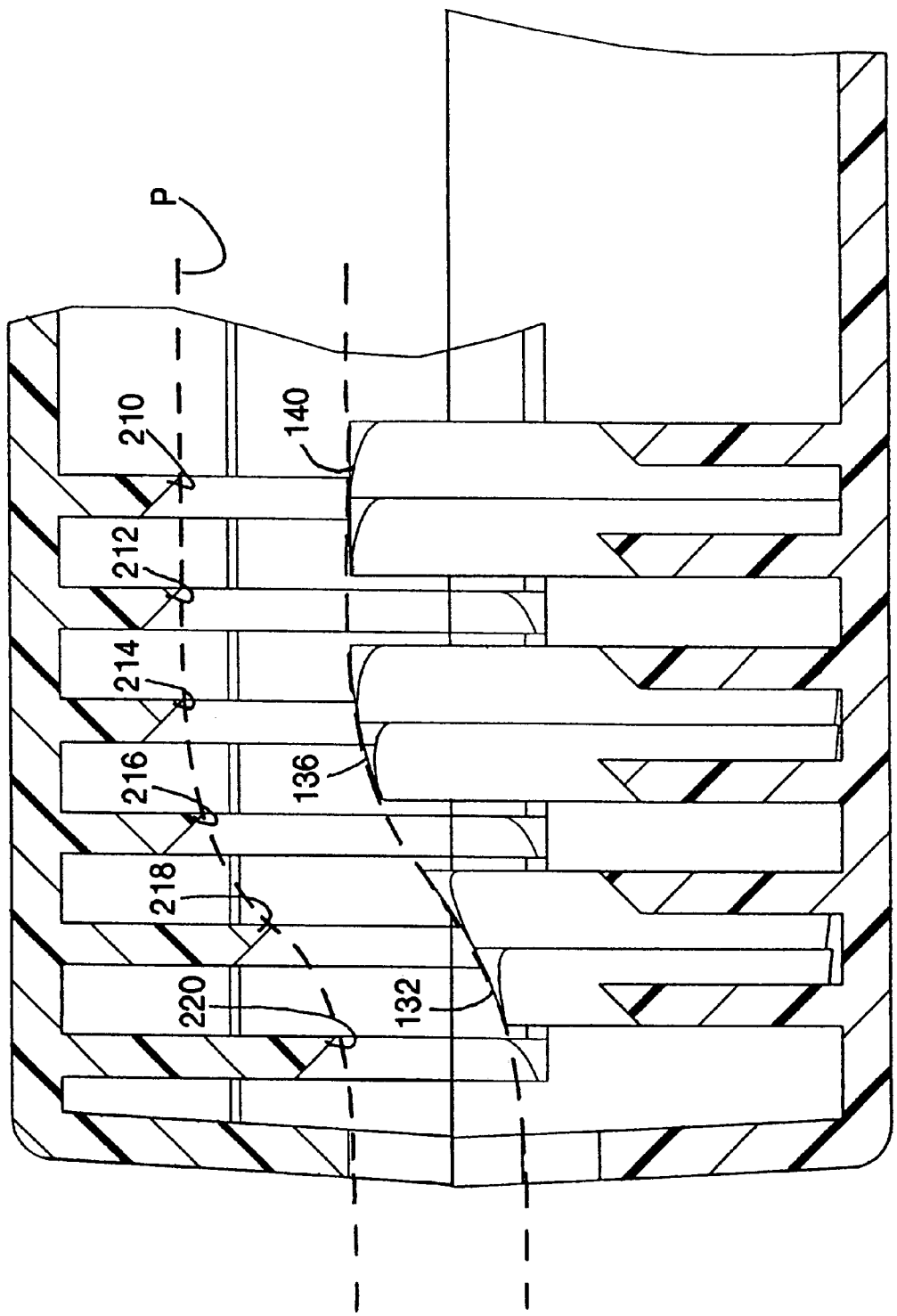
FIG. 5 is a combination of the cross sections of FIGS. 3 and 4 when in the closed position.

Furthermore, the contour of the top surfaces of the walls 50–54 assist in urging the cable into the associated transverse gripping edges 210–220 (FIG. 4). As shown best FIG. 5, the contour of the top walls, 132, 136, and 140, cooperates with the individual gripping edges 210–220 to form a sinuous-shaped pathway P as shown in FIG. 5. It should be appreciated that the distance between the contoured top surfaces 132, 136, and 140, together with the complementary gripping edges 210–220, form an interference fit with the outer insulation of the cable to grip the cable, but the interference is not so great that the gripping edges 210–220 pierce the cable insulation. It should also be appreciated that the side-to-side spacing of the gripping edges 230–240 on complementary upstanding walls 150–160 (FIG. 1A) is such that there is a gripping interference on the side edges of the cables 310 and 312 to take up strain associated with pulling either of the cables, so that the strain is not transferred to individual conductors such as 316, 318.

Thus, as shown above, the enclosure 2 provides for increased strain relief for drop wire splice applications. Furthermore, due to the inclusion of two different cable strain relief devices, two different cable sizes can be terminated and enclosed in the enclosure 2. Further advantageously, as the strain relief member 8 is receivable within strain relief member 10, and in fact assists in the strain relief of cables 310 and 312, the total profile or envelope of the enclosure is kept relatively small.

I claim:

1. An electrical connector housing having first and second housing parts movable between open and closed positions, said first and second housings cooperating to define a cable receiving opening into said housing, said first housing part having a first strain relief member positioned adjacent said opening, for gripping a cable of a first dimension, and said second housing part having a second strain relief member positioned adjacent said opening for gripping a cable of a second dimension, said first and second strain relief members having respective first and second cable receiving slots, and when in the closed position, said first strain relief member defines a first cable receiving slot profile, and said second strain relief member defines a second cable receiving slot profile, different in configuration than said first cable receiving slot profile, whereby alternative cables of either first or second dimension may be positioned within alternative first or second cable receiving slots and through said opening.

2. The connector housing of claim 1, wherein said connector housing is for splicing at least two cables, the housing having two cable receiving openings extending into said connector housing.

3. The connector housing of claim 2, wherein said connector housing is a clam shell style which, in the closed position, is substantially cylindrical in configuration.

4. The connector housing of claim 3, wherein said openings extend through opposing end walls of said connector housing.

5. The connector housing of claim 1, wherein said first strain relief member is profiled to overlap said second strain relief member.

6. The connector housing of claim 5, wherein said first strain relief member is defined by upstanding side walls and a transverse wall section interconnecting said side walls, said upstanding side walls flanking said first cable receiving slot.

7. The connector housing of claim 6, wherein said first strain relief member is defined as a plurality of individual upstanding side walls and transverse wall sections.

8. The connector housing of claim 7, wherein the upstanding side walls have barbed edges for gripping the cable.

9. The connector housing of claim 7, wherein the transverse wall sections are progressively lowered, from a position adjacent to said openings, to an inner position of said housing.

10. The connector housing of claim 9, wherein the second strain relief member is receivable between the upstanding side walls.

11. The connector housing of claim 1, wherein the first and second strain relief members are formed as sinuous slots.

12. The connector housing of claim 10, wherein upper surfaces of said second strain relief member are reversely progressed to conform to the profile defined by said transverse wall sections, whereby, when said first and second housing parts are in a closed position, said top surfaces and transverse wall portions cooperate to define a cable receiving channel therein.

13. An electrical connector for connection with a cable, having an insulative housing having at least one connection device therein for connection to a wire of the cable, said housing comprising an opening therethrough for receipt of the cable and a strain relief device proximate said opening, said strain relief device including a plurality of tandemly arranged walls having a longitudinal cable receiving slot therein, substantially transverse to said tandemly arranged walls, said tandemly arranged walls including opposed side wall sections and lower wall sections, said opposed side wall sections and said lower wall sections forming said cable receiving slot, and said opposed side wall sections and said lower wall sections having barbed edges for gripping the cable.

14. The electrical connector of claim 13, wherein said insulative housing is formed as a bi-partite housing formed by first and second housing parts, said strain relief device being positioned on said first housing part, and said second housing part including urging surfaces, opposing said slot, whereby when said first and second housing parts are in a closed position, said urging surfaces may urge the cable into said slot and against said barbed edges.

15. The electrical connector of claim 13, wherein said slot is sinuous in the longitudinal direction.

16. The electrical connector of claim 13, wherein the insulative housing is comprised of bi-partite housing members, with an opening at each end, with strain relief members adjacent each said opening.

17. The electrical connector of claim 14, further comprising a second strain relief member on said second bi-partite housing member, for accommodating a cable of a second dimension, whereby alternative cables can be terminated.

18. The electrical connector of claim 17, wherein the first strain relief device at least partially overlaps said second strain relief device, when in the closed position.

19. The electrical connector of claim 17, wherein a top surface of said tandemly arranged walls of said second strain relief device is positioned adjacent to said transverse wall sections of said first strain relief device, when in the closed position, and form said urging surfaces for urging the cable into the slot.

20. The connector housing of claim 19, wherein upper surfaces of said second strain relief member are reversely progressed to conform to the profile defined by said transverse wall sections, whereby, when said first and second housing parts are in a closed position, said top surfaces and transverse wall portions cooperate to define a cable receiving channel therein.

21. An electrical connector housing having first and second housing parts movable between open and closed positions, said first and second housing parts cooperating to define a cable receiving opening into said housing, said first housing part having a first strain relief member positioned adjacent said opening for gripping a cable of a first dimension, said first strain relief member comprised of at least one upstanding wall section having a first cable receiving slot formed therein, with gripping edges on said wall section, and said second housing part having a second strain relief member positioned adjacent said opening for gripping a cable of a second dimension, said second strain relief member being profiled as a central wall section having a second cable receiving slot therethrough for receiving a cable of a second dimension, said central wall section having a top surface with a width narrower than said first cable receiving slot, said first and second strain relief members cooperating, such that when in the closed position, said second strain relief member being positioned intermediate said first strain relief member, and said top surface is opposed from said gripping edges of said first strain relief member, whereby alternative cables of either first or second dimension may be positioned within alternative first or second cable receiving slots and through said opening.

22. The connector housing of claim 21, wherein said connector housing is for splicing at least two cables, the housing having two cable receiving openings extending into said connector housing.

23. The connector housing of claim 22, wherein said connector housing is a clam shell style which, in the closed position, is substantially cylindrical in configuration.

24. The connector housing of claim 22, wherein said openings extend through opposing end walls of said connector housing.

25. The connector housing of claim 21, wherein said first strain relief member is defined by upstanding side wall sections and a transverse wall section interconnecting said side wall sections, said upstanding side wall sections flanking said first cable receiving slot.

26. The connector housing of claim 25, wherein said first strain relief member is defined as a plurality of individual upstanding walls, each having side wall sections and transverse wall sections.

27. The connector housing of claim 26, wherein the upstanding side wall sections and transverse wall sections have barbed edges for gripping the cable.

28. The connector housing of claim 26, wherein the transverse wall sections are progressively lowered, from a position adjacent to said openings, to an inner position of said housing.

29. The connector housing of claim 28, wherein the second strain relief member is receivable between the upstanding side walls.

30. The connector housing of claim 21, wherein the first and second cable receiving slots are formed as sinuous slots.

31. The connector housing of claim 30, wherein the slots are sinuous about axes which are orthogonal relative to each other.

32. The connector housing of claim 30, wherein upper surfaces of said second strain relief member are reversely progressed to conform to the profile defined by said transverse wall sections, whereby, when said first and second housing parts are in a closed position, said top surfaces and transverse wall portions cooperate to define a cable receiving channel therein.

33. The electrical connector of claim 32, wherein said top surface of said tandemly arranged walls of said second strain relief device is positioned adjacent to said transverse wall sections of said first strain relief device when in the closed position, and form urging surfaces for urging the cable into the slot.

34. The connector housing of claim 33, wherein upper surfaces of said second strain relief member are reversely progressed to conform to the profile defined by said transverse wall sections, whereby, when said first and second housing parts are in a closed position, said top surfaces and transverse wall portions cooperate to define a cable receiving channel therein.

\* \* \* \* \*